(12) United States Patent
Puligadda et al.

(10) Patent No.: US 6,323,310 B1
(45) Date of Patent: Nov. 27, 2001

(54) ANTI-REFLECTIVE COATING COMPOSITIONS COMPRISING POLYMERIZED AMINOPLASTS

(75) Inventors: Rama Puligadda; Runhui Huang, both of Rolla, MO (US)

(73) Assignee: Brewer Science, Inc., Rolla, MO (US)

( * ) Notice: Subject to any disclaimer, the term of this patent is extended or adjusted under 35 U.S.C. 154(b) by 0 days.

(21) Appl. No.: 09/552,236

(22) Filed: Apr. 19, 2000

(51) Int. Cl.$^7$ .................................................. C08G 73/06
(52) U.S. Cl. .................................................. 528/423
(58) Field of Search ............................................... 528/423

(56) References Cited

U.S. PATENT DOCUMENTS

| 5,731,385 | * | 3/1998 | Knors et al. | 525/327.6 |
| 5,939,510 | | 8/1999 | Sato et al. | 528/128 |
| 5,948,847 | * | 9/1999 | Iguchi et al. | 524/502 |
| 6,071,673 | | 6/2000 | Iguchi et al. | 430/271.1 |

FOREIGN PATENT DOCUMENTS

| 823661 | * | 2/1998 | (EP) . |
| 97/07145 | * | 2/1997 | (WO) . |
| 99/17161 | * | 4/1999 | (WO) . |
| WO9956178 | | 11/1999 | (WO) . |

* cited by examiner

*Primary Examiner*—Erma Cameron
(74) *Attorney, Agent, or Firm*—Hovey, Williams, Timmons & Collins

(57) ABSTRACT

Improved anti-reflective coating compositions for use in integrated circuit manufacturing processes and methods of forming these compositions are provided. Broadly, the compositions are formed by heating a solution comprising a compound including specific compounds (e.g., alkoxy alkyl melamines, alkoxy alkyl benzoguanamines) under acidic conditions so as to polymerize the compounds and form polymers having an average molecular weight of at least about 1,000 Daltons. The monomers of the resulting polymers are joined to one another via linkage groups (e.g., —CH$_2$—, —CH$_2$—O—CH$_2$—) which are bonded to nitrogen atoms on the respective monomers. The polymerized compound is mixed with a solvent and applied to a substrate surface after which it is baked to form an anti-reflective layer. The resulting layer has high k values and can be formulated for both conformal and planar applications.

11 Claims, 3 Drawing Sheets

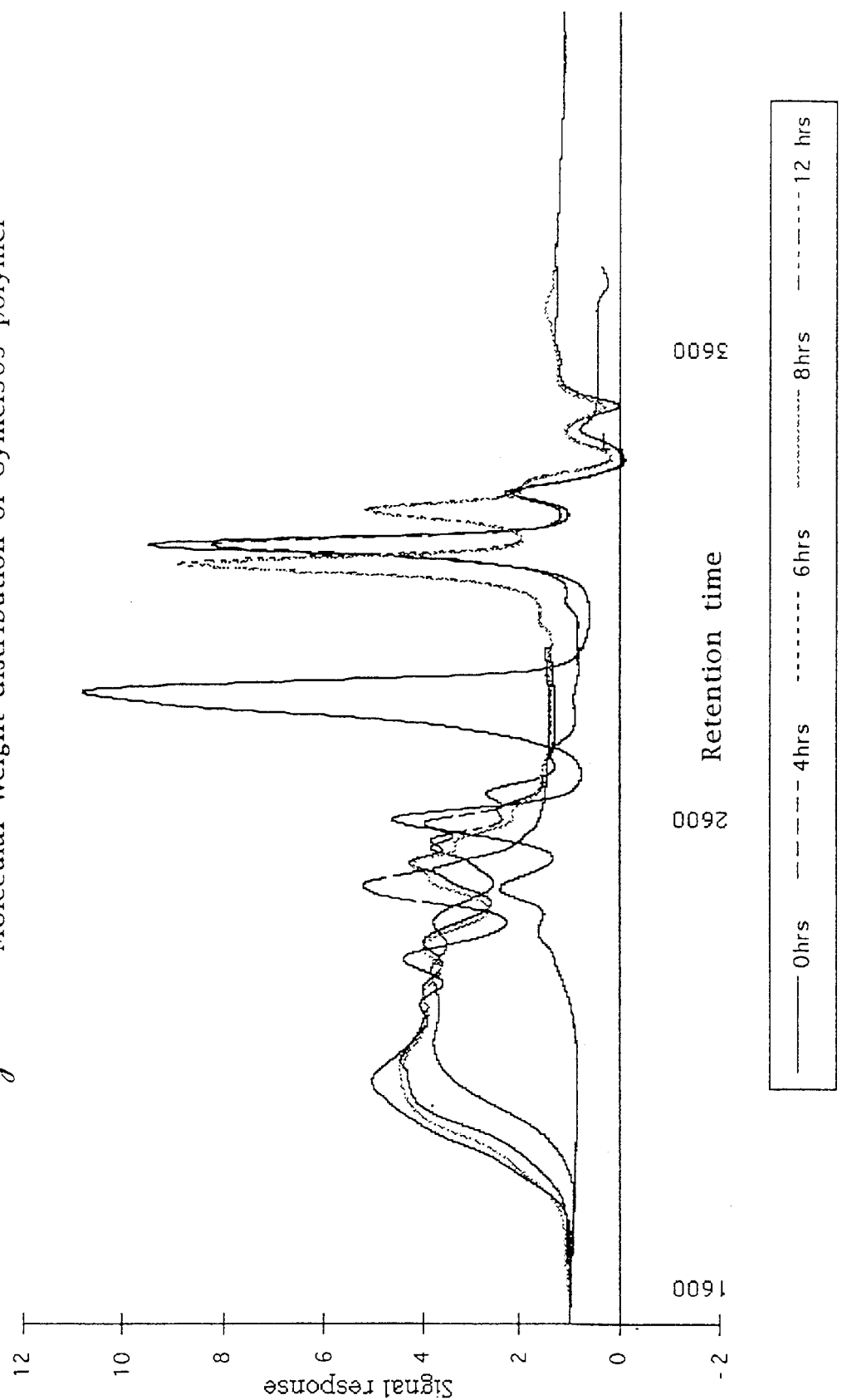

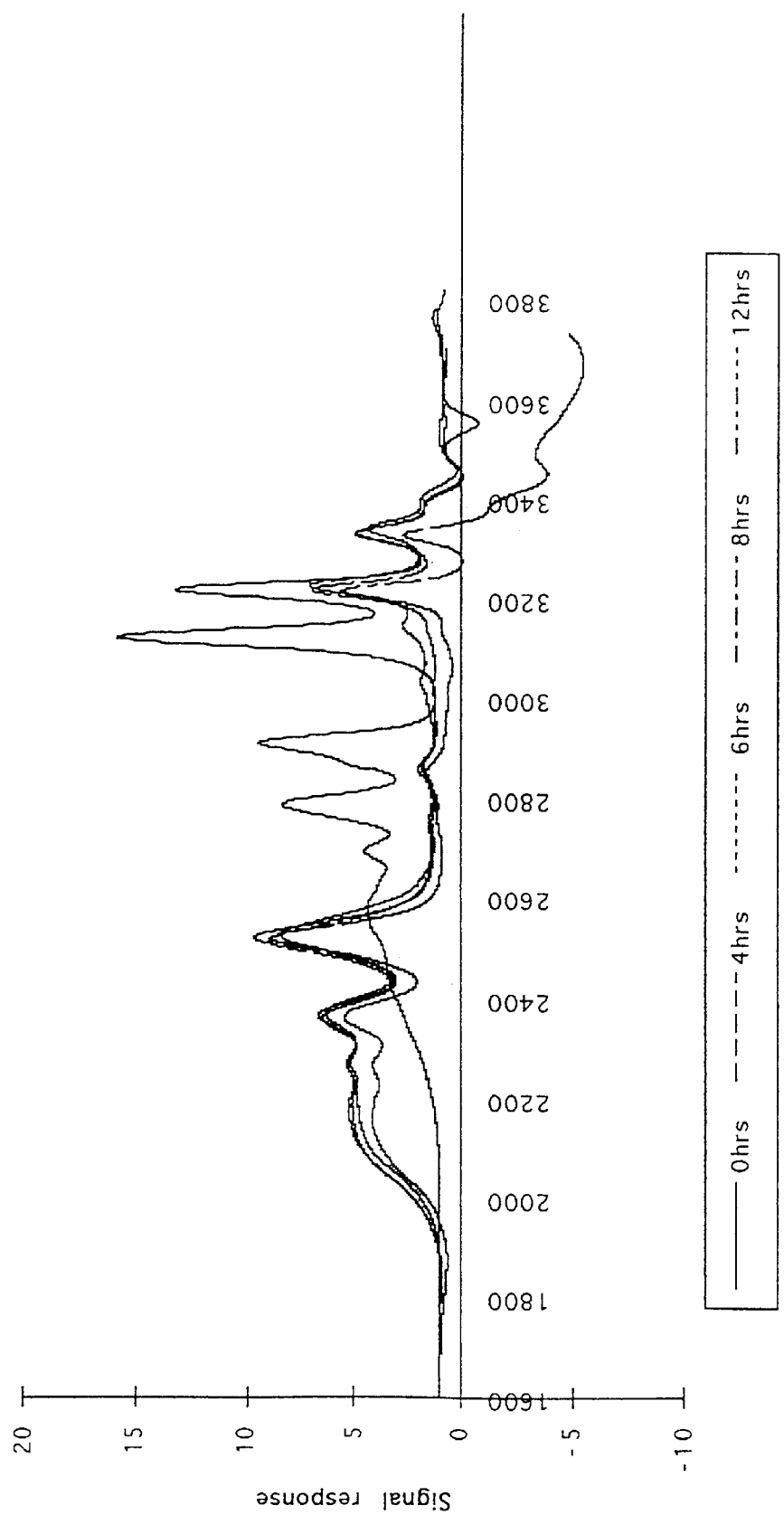
Fig. 2 Molecular weight distribution of Cymel303 grafted with 3hydroxy2 naphthoic acid

Fig. 3 Time conversion of functionality in Cymel system
|    | Methylol | Methoxymethylol |
|----|----------|-----------------|
| 0  | 11.13    | 88.86           |
| 1  | 27.98    | 81.48           |
| 2  | 27.36    | 69.52           |
| 4  | 23.81    | 69.77           |
| 8  | 18.56    | 51.87           |
| 12 | 19.10    | 36.89           |
| 16 | 19.37    | 42.07           |
| 24 | 24.14    | 31.43           |
| 49 | 18.45    | 15.41           |
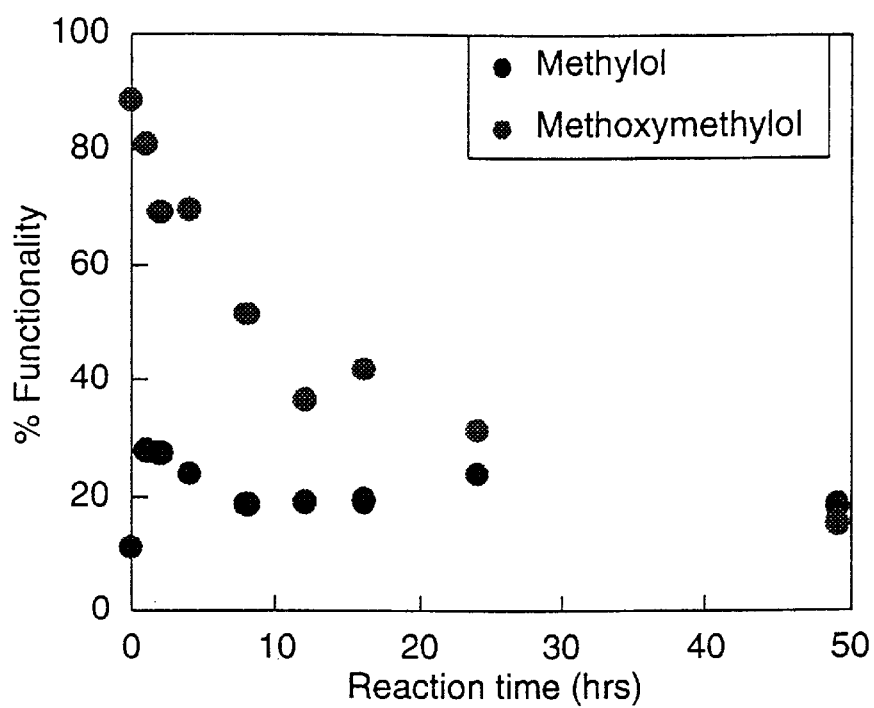

ANTI-REFLECTIVE COATING COMPOSITIONS COMPRISING POLYMERIZED AMINOPLASTS

BACKGROUND OF THE INVENTION

1. Field of the Invention

The present invention is broadly concerned with anti-reflective compositions and methods of forming the compositions for use as anti-reflective coating (ARC) layers on substrates during integrated circuit manufacturing processes. More particularly, the inventive compositions are formed by polymerizing aminoplasts (e.g., melamine, benzoguanamine) in an acidic environment under elevated temperatures to yield cross-linkable, UV absorbing, fast etching compositions.

2. Description of the Prior Art

A frequent problem encountered by photoresists during the manufacturing of semiconductor devices is that activating radiation is reflected back into the photoresist by the substrate on which it is supported. Such reflectivity tends to cause blurred patterns which degrade the resolution of the photoresist. Degradation of the image in the processed photoresist is particularly problematic when the substrate is non-planar and/or highly reflective. One approach to address this problem is the use of a bottom anti-reflective coating (BARC) applied to the substrate beneath the photoresist layer.

Fill compositions which have high optical density at the typical exposure wavelengths have been used for some time to form these BARC layers. The BARC compositions typically consist of an organic polymer which provides coating properties and a dye for absorbing light. The dye is either blended into the composition or chemically bonded to the polymer. Thermosetting BARC's contain a cross-linking agent in addition to the polymer and dye. Cross-linking must be initiated, and this is typically accomplished by an acid catalyst present in the composition. As a result of all these ingredients which are required to perform specific and different functions, prior art BARC compositions are fairly complex.

U.S. Pat. No. 5,939,510 to Sato et al. discloses a BARC composition which comprises a UV absorber and a cross-linking agent. The UV absorber is a benzophenone compound or an aromatic azomethine compound having at least one unsubstituted or alkyl-substituted amino group on the aryl groups. The cross-linking agent disclosed by Sato et al. is a melamine compound having at least two methylol groups or alkoxymethyl groups bonded to the nitrogen atoms of the molecule.

The Sato et al. composition suffers from two major drawbacks. First, in the two-component composition disclosed, the Sato et al. composition does not include a polymeric material thus resulting in insufficient coverage on the surfaces and edges of the substrate features. Furthermore, the UV absorber disclosed by Sato et al. is physically mixed with the cross-linking agent rather than chemically bonded to some component of the composition. As a result, the UV absorber will often sublime, and in many cases sublime and diffuse into the subsequently applied photoresist layer.

There is a need for a less complex anti-reflective composition which provides high reflection control and increased etch rates while minimizing or avoiding intermixing with photoresist layers.

SUMMARY OF THE INVENTION

The present invention overcomes these problems by broadly providing improved anti-reflective compositions which are formed from a minimal number of components (e.g., two or less) and which exhibit the properties necessary in an effective BARC composition.

In more detail, anti-reflective compositions according to the invention include polymers comprising monomers derived from compounds of Formula I and mixtures thereof.

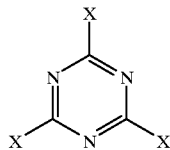

Formula I wherein each X is individually selected from the group consisting of $NR_2$ (with the nitrogen atom being bonded to the ring structure) and phenyl groups, where each R is individually selected from the group consisting of hydrogen, alkoxyalkyl groups, carboxyl groups, and hydroxymethyl groups. Preferred compounds of Formula I include the following:

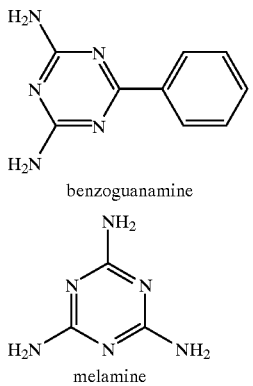

When used in reference to Formula I the phrase "monomers derived from compounds of Formula I" is intended to refer to functional moieties of Formula I. For example, each of the structures of Formula II is derived from compounds of Formula I.

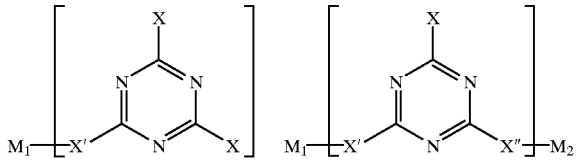

Formula II wherein: each X is individually selected from the group consisting of $NR_2$ (with the nitrogen atom being bonded to the ring structure) and phenyl groups, where each R is individually selected from the group consisting of hydrogen, alkoxyalkyl groups, carboxyl groups, and hydroxymethyl groups; and "$M_1$" and "$M_2$" represent a molecule (e.g., a chromophore or another monomer derived from the compound of Formula I) bonded to X' or X''. Thus, "monomers derived from the compounds of Formula I" would include those compounds where any of the constituents (i.e., any of the X groups, and preferably 1–2 of the X groups) is bonded to another molecule.

The polymerized monomers are preferably joined by linkage groups selected from the group consisting of —CH$_2$—, —CH$_2$—O—CH$_2$, and mixtures thereof, with the linkage groups being bonded to nitrogen atoms on the respective monomers. For example, Formula III demonstrates two methoxymethylated melamine moieties joined via a —CH$_2$— linkage group and two methoxymethylated melamine moieties joined via a —CH$_2$—O—CH$_2$— linkage group.

and preferably from about 0.01–0.5 moles of acid per liter of dispersant. Furthermore, the heating step should be carried out for at least about 2 hours, and preferably from about 4–6 hours. In applications where only benzoguanamine-based moieties are utilized, the heating step should be carried out for a time period of less than about 7 hours, and preferably from about 5.5–6.5 hours.

Heating the starting compounds under acidic conditions causes the compounds to polymerize by forming the previ- Formula III

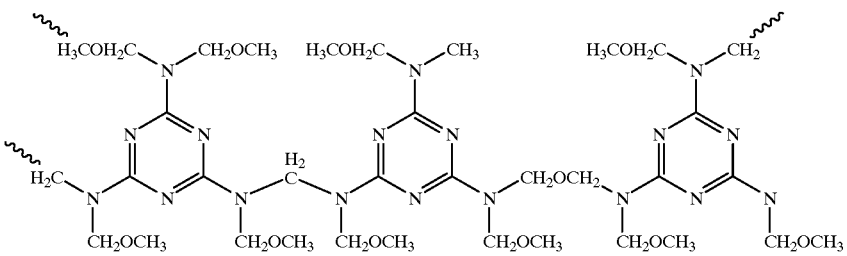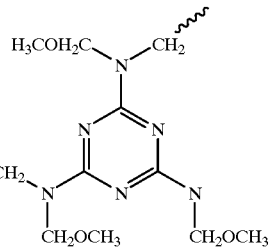

Formula IV illustrates two benzoguanamine moieties joined via CH$_2$ linkage groups.

Formula IV

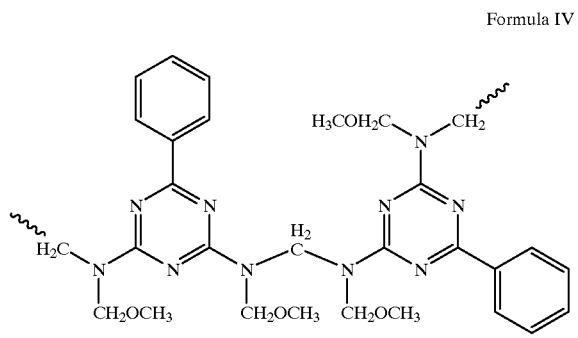

Finally, Formula V illustrates two methoxymethylated melamine moieties having a chromophore (2,4-hexadienoic acid) bonded thereto and joined via CH$_2$ linkage groups.

ously described linkage groups. The polymers resulting from the heating step should have an average molecular weight of at least about 1,000 Daltons, preferably at least about 5,000 Daltons, and more preferably at least about 5,000–20,000 Daltons. Furthermore, about 12 hours after the heating step the resulting anti-reflective composition should have a decrease of at least about 20%, preferably at least about 40%, and more preferably from about 40–70% in methoxymethylol (—CH$_2$OCH$_3$) groups than were present in the starting dispersions of Formula I compounds, with the quantity of methoxymethylol groups being determined by the titration procedure as herein defined.

It will be appreciated that the inventive polymer compositions provide significant advantages over prior art compositions in that the polymerized compositions alone act as conventional anti-reflective coating polymer binders, cross-linking agents, and chromophores, thus greatly simplifying the anti-reflective coating system.

In applications where enhanced light absorbance is desired, a chromophore (e.g., 2,4-hexadienoic acid, 3-hydroxy-2-naphthoic acid) can be mixed with the starting Formula V

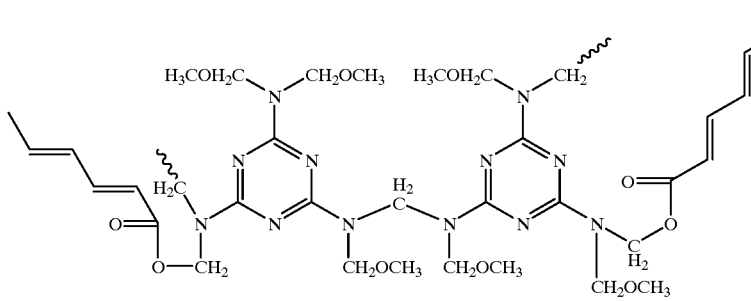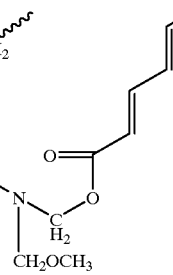

The inventive compositions are formed by providing a dispersion of the compounds of Formula I in a dispersant (preferably an organic solvent such as ethyl lactate), and adding an acid (such as p-toluenesulfonic acid) to the dispersion either prior to or simultaneous to heating of the dispersion to a temperature of at least about 70° C., and preferably at least about 120° C. The quantity of acid added should be from about 0.001–1 moles per liter of dispersant, dispersion prior to acid and heat treatment. During subsequent acid treatment, the chromophore will chemically bond to the monomers during polymerization.

The resulting polymerized composition is mixed with a solvent to form an anti-reflective coating composition. Suitable solvents include propylene glycol monomethyl ether, propylene glycol monomethyl ether acetate, ethyl lactate, and cyclohexanone. The anti-reflective coating composition is subsequently applied to the surface of a substrate (e.g., silicon wafer) by conventional methods, such as by spin-coating, to form an anti-reflective coating layer on the substrate. The substrate and layer combination is baked at temperatures of at least about 160° C. The baked layer will generally have a thickness of anywhere from about 500 Å to about 2000 Å.

In an alternate embodiment, an anti-reflective composition is formed by preparing a dispersion including, in a dispersant (e.g., propylene glycol monomethyl ether, propylene glycol monomethyl ether acetate, ethyl lactate), a quantity of the compound of Formula I and a polymer having cross-linking sites therein. The composition should comprise at least about 1.5% by weight of the polymer, and preferably from about 2.0–20% by weight of the polymer, based upon the total weight of the solids in the composition taken as 100% by weight. The molecular weight of the polymer is at least about 2,000 Daltons, and preferably from about 5,000–100,000 Daltons. The cross-linking sites on the polymer preferably comprise a cross-linking group selected from the group consisting of hydroxyl, carboxylic, and amide groups. The most preferred polymers include cellulose acetate hydrogen phthalate, cellulose acetate butyrate, hydroxypropyl cellulose, ethyl cellulose, polyesters, polyacrylic acid, and hydroxypropyl methacrylate.

In this embodiment, it is not necessary to heat the dispersion. However, as was the case with the first embodiment, the composition preferably includes an acid such as p-toluenesulfonic acid. Advantageously, it is not necessary to add a chromophore to the composition as the compound of Formula I also functions as a light-absorber.

Thus, the composition is preferably essentially free (i.e., less than about 0.5% by weight, preferably less than about 0.1% by weight, and more preferably about 0% by weight) of any added chromophores.

In either embodiment, low molecular weight (e.g., less than about 13,000 Daltons) polymeric binders can be utilized in the dispersion (after heating and acidification steps in the case of the first embodiment) to assist in forming highly planar layers. Alternately, a high molecular weight polymeric binder (e.g., acrylics, polyester, or cellulosic polymer such as cellulose acetate hydrogen phthalate, hydroxypropyl cellulose, and ethyl cellulose) having a molecular weight of at least about 100,000 Daltons can be mixed with the starting dispersion (also after heating and acidification steps in the case of the first embodiment) to assist in forming conformal layers. This will result in an anti-reflective layer having a percent conformality of at least about 60%, even on topographic surfaces (i.e., surfaces having raised features of 1000 Å or greater and/or having contact or via holes formed therein having hole depths of from about 1000–15,000 Å).

As used herein, percent conformality is defined as:

$$100 \cdot \frac{|(\text{thickness of the film at location } A) - (\text{thickness of the film at location } B)|}{(\text{thickness of the film at location } A)},$$

wherein: "A" is the centerpoint of the top surface of a target feature when the target feature is a raised feature, or the centerpoint of the bottom surface of the target feature when the target feature is a contact or via hole; and "B" is the halfway point between the edge of the target feature and the edge of the feature nearest the target feature. "Feature" and "target feature" is intended to refer to raised features as well as contact or via holes. As also used in this definition, the "edge" of the target feature is intended to refer to the base of the sidewall forming the target feature when the target feature is a raised feature, or the upper edge of a contact or via hole when the target feature is a recessed feature. Percent planarization is defined as:

$$100 - \% \text{ conformality}.$$

Regardless of the embodiment, anti-reflective layers formed according to the invention will absorb at least about 90%, and preferably at least about 95%, of light at wavelengths of from about 190–260 nm. Furthermore, the anti-reflective layers have a k value (i.e., the imaginary component of the complex index of refraction) of at least about 0.2, and preferably at least about 0.5, at the wavelength of interest. Finally, the anti-reflective layers have high etch rates, particularly when melamine is utilized. The etch selectivity to resist will be at least about 1.5, and preferably at least about 2.0 when $CF_4$ is used as the etchant.

BRIEF DESCRIPTION OF THE DRAWINGS

FIG. 1 is a graph depicting the molecular weight distribution of polymerized Cymel® 303 as a function of reaction time;

FIG. 2 is a graph depicting the molecular weight distribution of polymerized Cymel® 303 having 3-hydroxy-2-naphthoic acid bonded thereto as a function of reaction time; and FIG. 3 is a graph depicting the change in the methylol and methoxymethylol groups over time.

DETAILED DESCRIPTION OF THE PREFERRED EMBODIMENTS

EXAMPLES

The following examples set forth preferred methods in accordance with the invention. It is to be understood, however, that these examples are provided by way of illustration and nothing therein should be taken as a limitation upon the overall scope of the invention.

Testing Procedures

1. Stripping Test Procedure

In the following examples, a stripping test was performed to determine the resistance of the experimental anti-reflective coating (ARC) to photoresist solvents. In this procedure, an ARC formulation was spin-coated onto a silicon wafer at a spin speed of 2,500 rpm for 60 seconds and at an acceleration of 20,000 rpm/second. The film was baked on a hotplate at 205° C. for 60 seconds. The ARC film thickness was then measured at multiple points on the wafer using ellipsometry.

Ethyl lactate was puddled onto the silicon wafer for 10 seconds, followed by spin drying at 3,500 rpm for 30 seconds to remove the solvent. The film was then baked on a hotplate at 100° C. for 30 seconds. The ARC film thickness was again measured at multiple points on the wafer using ellipsometry. The amount of stripping was determined to be the difference between the initial and final average film thicknesses, with the uncertainty in the stripping measurement being the sum of the two average thickness measurement uncertainties.

2. Interlayer Formation Procedure

In the following examples, the degree of intermixing between the sample ARC and the photoresist was determined. In this procedure, an ARC formulation was spin-coated onto a silicon wafer at a spin speed of 2,500 rpm for 60 seconds and at an acceleration of 20,000 rpm/second. The film was baked on a hotplate at 205° C. for 60 seconds. The ARC film thickness was then measured at multiple points on the wafer using ellipsometry.

A photoresist (UV6, available from Shipley) was spin-coated on top of the ARC film at a spin speed of 3250 rpm for 30 seconds and at an acceleration of 20,000 rpm/second under ambient conditions. The wafer was then baked on a hotplate for 130° C. for 60 seconds and exposed to 20 mJ of exposure energy, after which a post-exposure bake was performed on the wafer at 130° C. for 90 seconds.

The photoresist was developed with Shipley LDD26W developer for 40 seconds. The sample was then rinsed with distilled water and spun dry at 2,000 rpm for 20 seconds followed by baking on a hotplate for 100° C. for 30 seconds. The film thickness was again measured at multiple points on the wafer using ellipsometry. The difference in the two film thickness averages (Å) was recorded as the interlayer stripping result with the uncertainty in the interlayer measurement being the sum of the two average thickness measurement uncertainties.

3. Titration Procedure a. Free Formaldehyde Analysis

A 10% $Na_2SO_3$ (aq) solution was prepared by mixing 50 g of $Na_2SO_3$ with 450 g of water. A few drops of rosolic acid was added to this solution until it turned red after which 1N HCl (aq) was added to the solution until it turned to a color between pale pink and colorless. The shelf life of the resulting solution is 2–3 days.

The sample to be tested was prepared by mixing 1.5 g of the sample with 10 ml of 1,4-dioxane. Next, 20 g of the previously prepared 10% $Na_2SO_3$ solution was added to the flask and the flask was agitated with a magnetic stirrer. While stirring, 1N HCl (aq) was titrated into the flask until the solution turned pale pink or colorless. The free formaldehyde was then determined by the following equation:

$$Y=[(A-BL)*(30.03/1000)* 100]/W,$$

where "A" is the amount (in ml) of titrated 1HCl, "BL" is the amount (in ml) titrated for a blank (i.e., 1,4-dioxane only), "W" is the weight of the sample in grams, and "Y" is the weight percent of free formaldehyde in the solution. Thus, the total free formaldehyde weight (X) is:

$$[(total\ solution\ weight\ in\ g)*(Y)]100.$$

b. —$CH_2OH$ Analysis

In this procedure, 1 g of the sample was mixed with 20 ml of 1,4-dioxane in a beaker followed by sonication for two minutes. The solution was then transferred to a flask, and the beaker was rinsed three times with 10 ml portions of water (for a total of 30 ml), with the rinse water being added to the flask after each rinsing. Next, 25 ml of 12 (0.1N) and 10 ml of 2N NaOH (aq) were added to the solution, the flask was capped tightly, and the solution was allowed to stand for 10 minutes. The solution was then titrated with 0.1N $Na_2S_2O_3$ (aq) until it turned a purple-brown color. The percent —$CH_2OH$ was then determined according to the following equation:

$$\%—CH_2OH=(B-A)*0.*(1.502/weight\ of\ sample\ in\ g)-X,$$

where "A" is the amount (in ml) titrated for a blank (i.e., 1,4-dioxane only), "B" is the amount (in ml) of titrated 0.1N $Na_2S_2O_3$, and "X" is the total free formaldehyde weight determined as described in part (a) above.

c. —$CH_2OCH_3$ Analysis

In this procedure, 1 g of the sample was mixed with 20 ml of 1,4-dioxane in a beaker followed by sonication for two minutes. The solution was then transferred to a flask, and the beaker was rinsed three times with 10 ml portions of water (for a total of 30 ml), with the rinse water being added to the flask after each rinsing. Next, 20 ml of 2N of $H_2SO_4$ (aq) was added to the flask and the solution was allowed to stand for 20 minutes at a temperature of 30–35° C. To the solution, 25 ml of $I_2$(0.1N) and 25 ml of 2N NaOH (aq) were added, the flask was capped tightly, and the solution was allowed to stand for 15 minutes at room temperature. An additional 20 ml of 2N $H_2SO_4$ (aq) was mixed with the solution, and the solution was titrated with 0.1N $Na_2S_2O_3$ (aq) until it turned from a purple-brown color to colorless. The percent —$CH_2OCH_3$ was then determined according to the following equation:

$$\%—CH_2OCH_3=(B-A)*0.1*(1.502/weight\ of\ sample\ in\ g)-X,$$

where "A" is the amount (in ml) titrated for a blank (i.e., 1,4-dioxane only), "B" is the amount (in ml) of titrated 0.1N $Na_2S_2O_3$, and "X" is the total free formaldehyde weight determined as described in part (a) above.

Example 1

Cymel® 303 (40.0 g, available from Cytec Industries, Inc., New Jersey) was dissolved in 180.0 g of ethyl lactate in a 500 ml round-bottomed flask. In a 50 ml beaker, 1.0 g of p-toluenesulfonic acid (pTSA) was dissolved in 20 g of ethyl lactate. The round-bottomed flask was fitted with a nitrogen source, a water condenser, and a thermometer, and the contents of the flask heated to 120° C. in an oil bath. The pTSA solution was added to the beaker via an addition funnel. The resulting solution was maintained at a temperature of 120° F. for 12 hours. During this 12-hour time period, 50 g aliquots of the solution were collected at 0 hours, 4 hours, 6 hours, 8 hours, and 12 hours, and labeled as Samples 1–5, respectively.

Each of the samples was cooled and filtered through a 0.1 micron filter. An anti-reflective coating was formulated from the cooled samples 1–5 by adding 73.0 g of propylene glycol monomethyl ether (PGME) to the cooled and filtered samples. The inolecular weight distribution profiles of these samples were determined using a gel permeation chromatograph with a refractive index detector and 50 Å, 100 Å, and 500 Å Phenogel (Phenomenex) columns in series. These results are shown in FIG. 1.

Silicon wafers were spin-coated with each of the above formulations at 2500 rpm for 60 seconds followed by drying and baking at 205° C. for 60 seconds. The film thickness was measured, and the optical parameters of the film were determined. This data is reported in Table 1. The etch selectivity to resist (DUV42) with $CF_4$ as the etchant was 1.52.

TABLE 1

| Sample | Reaction time (hours) | Thickness Å | n | k | Stripping Test Å | Interlayer Test Å |
|---|---|---|---|---|---|---|
| 1 | 0 | 1341 | 2.08 | 0.182 | −2 ± 11 | 30 ± 34 |
| 2 | 4 | 1657 | 2.07 | 0.247 | −88 ± 41 | 84 ± 42 |
| 3 | 6 | 1728 | 2.08 | 0.229 | −20 ± 17 | 93 ± 15 |
| 4 | 8 | 1741 | 2.07 | 0.237 | −23 ± 21 | 92 ± 21 |
| 5 | 12 | 1877 | 2.07 | 0.237 | −14 ± 13 | 101 ± 38 |

Example 2

Cymel® 303(40.0 g) and 8.0 g of 3-hydroxy 2-naphthoic acid were dissolved in 180.0 g of ethyl lactate in a 500 ml round-bottomed flask. In a 50 ml beaker, 1.0 g of pTSA was dissolved in 20 g of ethyl lactate. The round-bottomed flask was fitted with a nitrogen source, a water condenser, and a thermometer, and the contents of the flask heated to 120° C. in an oil bath. The pTSA solution was added to the beaker via an addition funnel. The resulting solution was maintained at a temperature of 120° F. for 12 hours. During this 12-hour time period, 50 g aliquots of the solution were collected at 0 hours, 4 hours, 6 hours, 8 hours, and 12 hours, and labeled as Samples 1–5, respectively.

Each of the samples was cooled and filtered through a 0.1 micron filter. An anti-reflective coating was formulated from samples 1–5 by adding 73.0 g of PGME to the cooled and filtered samples. The molecular weight distribution profiles of these samples were determined using a gel permeation chromatograph with a refractive index detector and 50 Å, 100 Å, and 500 Å Phenogel columns in series. These results are shown in FIG. 2.

Silicon wafers were spin-coated with each of the above formulations at 2500 rpm for 60 seconds followed by drying and baking at 205° C. for 60 seconds. The film thickness was measured, and the optical parameters of the film were determined. This data is reported in Table 2. The etch selectivity to resist (DUV42) with $CF_4$ as the etchant was 1.40.

TABLE 2

| Sample | Reaction time (hours) | Thickness Å | n | k | Stripping Test Å | Interlayer Test Å |
|---|---|---|---|---|---|---|
| 1 | 0 | 2255 | 2.08 | 0.477 | −4 ± 17 | 40 ± 64 |
| 2 | 4 | 2021 | 2.07 | 0.459 | 2 ± 7 | 61 ± 27 |
| 3 | 6 | 1928 | 2.08 | 0.469 | −2 ± 8 | 61 ± 34 |
| 4 | 8 | 1926 | 2.08 | 0.468 | −7.8 ± 13 | 63 ± 11 |
| 5 | 12 | 1957 | 2.07 | 0.461 | 8.8 ± 0 | 50 ± 49 |

Example 3

Cymel® 303 and Cymel® 1123 (see Table 3 for amounts) were dissolved along with 0.75 g of pTSA were dissolved in 150.0 g of ethyl lactate in a 500 ml round bottomed flask. The flask was fitted with a nitrogen source, a water condenser, and a thermometer after which the flask contents were heated to 120° C. in an oil bath and maintained at this temperature for 12 hours. The sample was filtered through a 0.1 micron filter. An anti-reflective coating was formulated by adding PGME, p-toluenesulfonate or pyridine, and pyridinium tosylate (pPTS) to the prepared sample in the amounts indicated in Table 3.

The formulations were spin-coated on silicon wafers at 2500 rpm for 60 seconds followed by drying and baking at 205° C. for 60 seconds. The respective thicknesses of the films were measured, and the optical parameters were determined. This data is reported in Table 4.

TABLE 3

| Formulation | Cymel® 303 | Cymel® 1123 | PGME | Total Ethyl lactate | pyridine | pPTS | Total pTSA |
|---|---|---|---|---|---|---|---|
| I | 10 g | 20 g | 336.2 g | 247.6 g | — | — | 2 g |
| II | 25 g | 5 g | 336.3 g | 247.6 g | — | — | 2 g |
| III | 10 g | 20 g | 336.2 g | 247.6 g | 0.3 g | 1.65 g | 0.75 g |
| IV | 25 g | 5 g | 336.2 g | 247.6 g | 0.3 g | 1.65 g | 0.75 g |

TABLE 4

| Formulation | Thickness Å | n | k | Stripping Test Å | Interlayer Test Å | Etch Selectivity[A] |
|---|---|---|---|---|---|---|
| I | 749 | 1.970 | 0.484 | −2 | 39 | 1.3 |
| II | 720 | 2.106 | 0.363 | 0 | 30 | 1.6 |
| III | 747 | 1.945 | 0.461 | 2 | 40 | 1.3 |
| IV | 740 | 2.096 | 0.358 | 0 | 20 | 1.6 |

[A]Selectivity to resist (DUV42) with $CF_4$ as the etchant.

Example 4

Cellulose acetate hydrogen phthalate (3.0 g and having an average molecular weight of about 100,000 Daltons) was dissolved in 130.5 g of PGME. Next, 11.5 g of Cymel® 1125, 5.0 g of Cymel® 303, 150 g of propylene glycol monomethyl ether acetate (PGMEA), and 1.15 g of pTSA was added to the prepared solution and allowed to dissolve completely. The resulting solution was then filtered through a 0.1 micron.

The prepared formulation was spin-coated on silicon wafers at 2500 rpm for 60 seconds followed by drying and baking at 205° C. for 60 seconds. The film thickness was measured, and the optical properties determined. This data is reported in Table 5. The percent conformality of the film was determined to be 60%.

TABLE 5

| Thickness Å | n | k | Stripping Test Å | Interlayer Test Å |
|---|---|---|---|---|
| 1280 | 1.92 | 0.35 | 0 ± 10 | 0 ± 40 |

Example 5

Cymel® 303 (25 g) and Cymel® 1123 (5 g) were dissolved along with 2 g of pTSA in 247.6 g of ethyl lactate. The resulting mixture was heated to 120° C., and the methylol and methoxymethylol groups were measured over time according to above-defined titration procedure. These results are shown in FIG. 3. As indicated by these results, the methoxymethylol groups decreased over time as the Cymel® polymerized. It is believed that the methylol groups may be regenerating or that new methylol groups are forming during polymerization since the methoxymethylol groups are involved in the polymerization.

What is claimed is:

1. An anti-reflective composition including therein a quantity of a polymer and a chromophore chemically bonded to said polymer, said polymer comprising recurring monomers of the formula

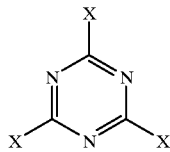

wherein each X is individually selected from the group consisting of NR₂ and phenyl groups, where each R is individually selected from the group consisting of hydrogen, alkoxyalkyl groups, carboxyl groups, and hydroxymethyl groups, said polymer having an average molecular weight of at least about 1,000 Daltons.

2. The composition of claim 1, said recurring monomers being joined together by linkage groups selected from the group consisting of —CH₂—, —CH₂—O—CH₂—, and mixtures thereof.

3. The composition of claim 1, said recurring monomers being joined together by linkage groups which bond to nitrogen atoms on the respective recurring monomers.

4. The composition of claim 1, wherein said Formula I compound is selected from the group consisting of benzoguanamine and melamine.

5. The composition of claim 1, said composition further comprising a polymer having an average molecular weight of at least about 100,000 Daltons.

6. The composition of claim 5, wherein said polymer is selected from the group consisting of cellulose acetate hydrogen phthalate, cellulose acetate butyrate, hydroxypropyl cellulose, ethyl cellulose, hydroxypropyl methacrylate, polyacrylic acid, and polyesters.

7. The composition of claim 1, said composition further comprising a chromophore.

8. The composition of claim 7, wherein said chromophore is selected from the group consisting of 2,4-hexadienoic acid and 3-hydroxy-2-naphthoic acid.

9. The composition of claim 1, wherein said composition comprises a solvent and said polymer is substantially dissolved in said solvent.

10. The composition of claim 9, wherein said solvent is selected from the group consisting of propylene glycol monomethyl ether, propylene glycol monomethyl ether acetate, ethyl lactate, and cyclohexanone.

11. An anti-reflective composition including therein a quantity of a polymer comprising recurring monomers of the formula

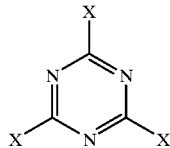

wherein each X is individually selected from the group consisting of NR₂ and phenyl groups where R is individually selected from the group consisting of hydrogen, alkoxyalkyl groups, carboxyl groups, and hydroxymethyl groups, said polymer having an average molecular weight of at least about 1,000 Daltons.

* * * * *

UNITED STATES PATENT AND TRADEMARK OFFICE
CERTIFICATE OF CORRECTION

PATENT NO. : 6,323,310 B1
DATED : November 27, 2001
INVENTOR(S) : Puligadda, Rama et al.

It is certified that error appears in the above-identified patent and that said Letters Patent is hereby corrected as shown below:

Column 12,
Line 27, please insert the word -- each -- after the word "where".

Signed and Sealed this

Fourteenth Day of January, 2003

JAMES E. ROGAN
*Director of the United States Patent and Trademark Office*